(No Model.)
C. R. HARTMAN.
SPRING HOE ATTACHMENT FOR CULTIVATORS, SEED DRILLS, &c.
No. 367,623. Patented Aug. 2, 1887.
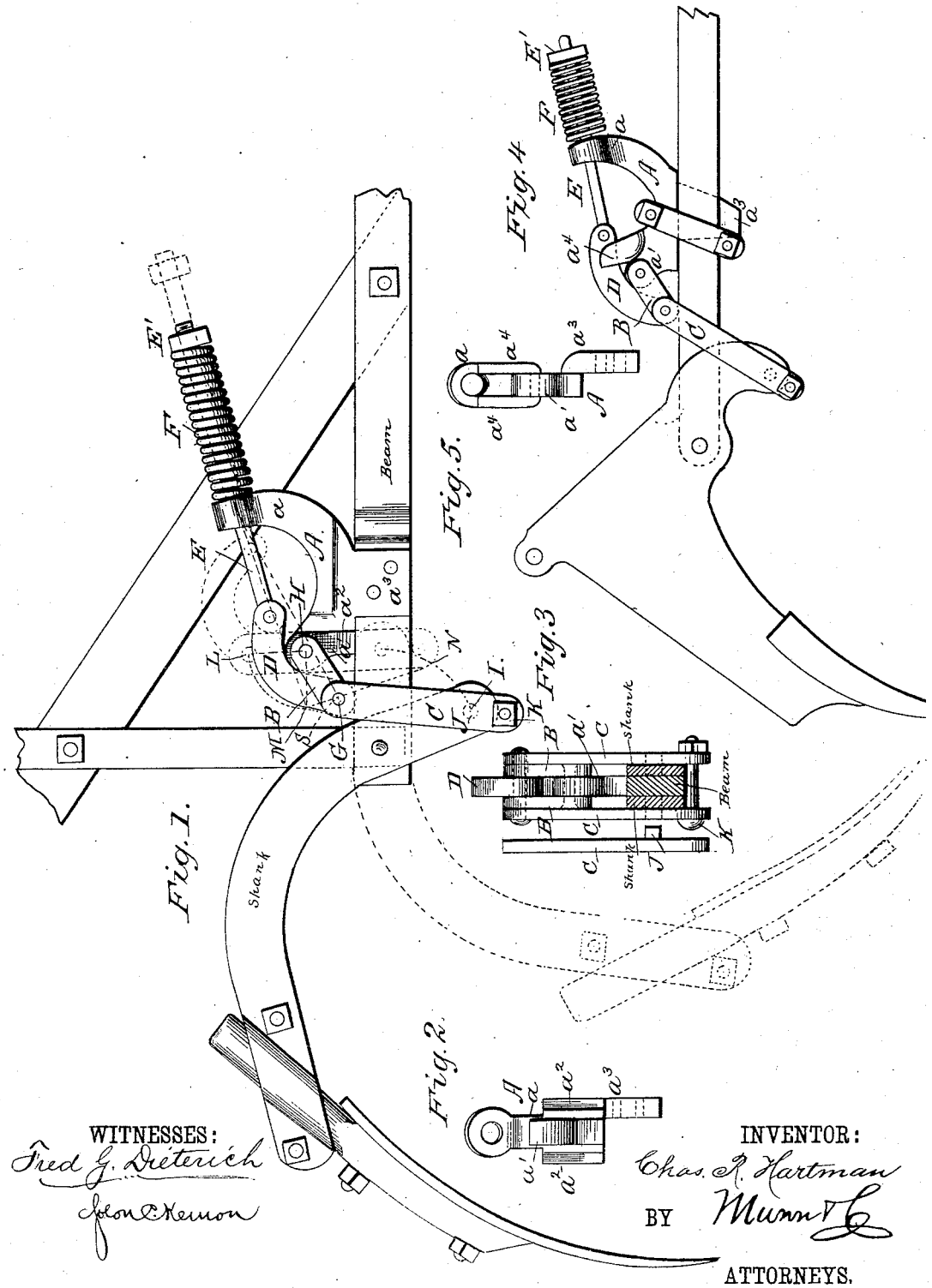
WITNESSES:
Fred G. Dieterich
John C. Kemon
INVENTOR:
Chas. R. Hartman
BY Munn & Co.
ATTORNEYS.

UNITED STATES PATENT OFFICE.

CHARLES R. HARTMAN, OF VINCENNES, INDIANA.

SPRING HOE ATTACHMENT FOR CULTIVATORS, SEED-DRILLS, &c.

SPECIFICATION forming part of Letters Patent No. 367,623, dated August 2, 1887.

Application filed December 22, 1886. Serial No. 222,307. (No model.)

*To all whom it may concern:*

Be it known that I, CHARLES R. HARTMAN, of Vincennes, in the county of Knox and State of Indiana, have invented a new and useful Improvement in Spring Hoe Attachments for Cultivators, Seed-Drills, &c., of which the following is a specification.

My invention consists in an improved spring hoe attachment for plows, cultivators, seed-drills, and other similar agricultural implements, which will be hereinafter fully described and claimed, and which possesses superior advantages in the points of efficiency in operation, compactness and simplicity in construction, and the ease with which it may be applied in its operative position to any plow, cultivator, &c.

Referring to the accompanying drawings, Figure 1 is a side elevation of my improvement in connection with a cultivator-shoe. Fig. 2 is a detail view of the bracket. Fig. 3 is a detached sectional view. Fig. 4 shows a slightly different construction, and shows the invention in connection with the boot of a drill; and Fig. 5 is a detail view of the form of bracket shown in Fig. 4.

The same letters of reference indicate corresponding parts in all the figures.

The object of the attachment is to furnish a locking device which shall hold the shovel of the implement to which it is attached with the requisite rigidity under ordinary strain while at work, but which shall yield to extraordinary strain to prevent breakage of the shovel or hoe, dispense with the objectionable removal of wooden break-pins, give the shovel the greatest possible sweep in proportion to the bulk of the attachment, bring the shovel back quickly to the precise depth in the ground at which it formerly stood when the obstruction is passed, and be strong and durable and adapted for use on various agricultural implements.

A represents the bracket of the attachment, formed with the downwardly-projecting piece $a^3$, for its attachment by bolts upon the beam of the plow or cultivator, as shown, the forward upwardly-curved arm, $a$, the bearing or fulcrum-head $a'$ at its rear end, and the side projections or shoulders, $a^2$.

To the rear end or fulcrum-head, $a'$, of the bracket A are pivoted what are normally the lower ends of the straight fulcrum-links B, against the outer side of the upper ends of which are pivoted, by the bolt H, the upper ends of the connecting-links C, and on this bolt H, between the upper ends of the fulcrum-links B, is pivoted the lower or rear end of the curved lever D, which is curved, as shown, nearly in the form of an arc of a circle, and to the forward end of this lever is pivoted the rear end of the rod E, which passes through the inclined aperture in the upper end of the arm $a$ of the bracket, and has on its outer upper threaded end a nut, E', and that part of the rod between this nut and the end of the arm $a$ is encircled by a heavy spiral spring, F, the strength or tension of which may be increased by screwing down the nut E'.

On the inner sides of the flat connecting-links C, near their lower ends, are formed the lugs J, which fit in the side openings in the upper end of the shank or foot-piece, as the case may be, and form a pivot for the upper end of the shank, the transverse bolt K at the lower ends of the plates C holding them to the sides of the shank, and so keeping the lugs J in the break-pin holes in the end of the shank.

It will be seen that normally the tension of the spring F holds the rod E and lever D drawn forward, with the connecting-links C resting firmly against the shoulders $a^2$ of the bracket, or the fulcrum-links B resting against the shoulders $a^4$, (shown in Fig. 4,) when that form of bracket is employed, and the shovel resting in its normal position, the pivots G and H being very nearly in a vertical line or at dead-centers, and by this arrangement the shovel is held firmly and rigidly in its operative position. On striking an immovable obstruction of any kind the extra strain will overcome the tension of the spring, when the shovel will be swung back and up, thus drawing down the connecting-links, which in turn swing the fulcrum-links out and down at their outer ends, thus drawing the curved lever backward, down over but clear of the fulcrum-head, and drawing back the rod F, the result of the peculiar shape and arrangement of the links and lever being as follows: As the upper ends of the fulcrum-links sweep or are swung from the point L to the point M the compression of the spring F is nineteen thirty-seconds of an inch, and the lower ends of the connecting-links are then at N, having moved but fourteen thirty-seconds of the distance through which they eventually move, while as the shovel continues to swing up the upper ends of the fulcrum-links move from the point M to the point S, the additional compression of the spring for this movement being but one thirty-second of an inch, and with this one thirty-second-of-an-inch compression of the spring the lower ends of the connecting-links sweep from the point N to I, moving eighteen thirty-seconds, or the greater part of the distance of the entire distance through which they travel. Thus it will be seen that by raising the fulcrum-point H above the limit of the stroke of the point or ends G, I get the larger half of the sweep of the shovel—eighteen thirty-seconds—with only one-twentieth of the compression of the spring required for the entire sweep, thus effecting a great economy of space and enabling the attachment to be constructed in a wonderfully-compact form. As soon as the shovel is relieved from or passes over the obstruction the power of the spring gains rapidly as the point G rises above the fulcrum-point H, and the shovel is jerked back with sufficient force to retake the same angle and depth in the soil as before, and the attachment is again locked as before, the shoulders $a^2$ or $a^4$, as the case may be, setting the limit of the back-stroke of the spring.

From the foregoing description, taken in connection with the accompanying drawings, the construction, operation, and advantages of my invention will be clearly understood.

It will be seen that the attachment can be readily applied to a cultivator, seed-drill, or plow of ordinary construction, as shown in the several views of the drawings, and when attached directly to a foot-piece of ordinary construction, as shown in Fig. 4, the bolt K, in addition to preventing the lugs J from coming out of the brake-pin holes of the foot-piece, will at the same time prevent spreading and breaking of the upper end of the foot-piece, while enabling the front wall in the upper end of the foot-piece to be dispensed with.

All the parts of the attachment, except the spring, are made of malleable iron, and the attachment is therefore very inexpensive. Any other suitable form of spring may be employed instead of the spiral spring here shown, if desired.

In Fig. 4 I show the bracket A as clipped to the beam, and having its depending portion extended down on the left instead of the right side of the beam; but, if desired, this form of bracket may have its portion $a^3$ arranged to extend on the right of the beam, as will be understood from Fig. 5. In Fig. 4 the invention is shown in its application to a drill-boot, and the bracket has shoulders $a^4$, which are abutted by the fulcrum-links B, the shoulders $a^2$ being dispensed with in this case, the line of draft being at such angle that the bars C could not abut shoulders $a^2$.

Having thus described my invention, what I claim is—

1. The herein-described attachment, consisting of the bracket formed with the downward projection, the fulcrum-head at its rear upper end, the forward-curved arm having the opening in its upper end, and the side shoulders, the fulcrum-links, the connecting-links, the curved lever, the rod, and the spiral spring, all constructed and arranged as herein set forth.

2. The attachment consisting of the bracket formed with the downward projection, the fulcrum-head, the forward arm having the opening in its upper end, and the side shoulders, the fulcrum-links, the connecting-links formed with the lugs on their inner sides, the curved lever, the rod having the threaded upper end, and the nut and the spiral spring, substantially as set forth.

3. The combination, with a shank, foot-piece, or drill-tooth of the usual construction and its beam, of the herein-described attachment consisting of the bracket formed with the downward projection, the fulcrum-head, the forward arm having the opening in its upper end, and the side shoulders, the fulcrum-links, the connecting-links formed with the lugs on their inner sides, the curved lever, the rod having the threaded upper end, and the nut and the spiral spring, substantially as set forth.

CHARLES R. HARTMAN.

Witnesses:
LOUIS A. MEYER,
J. C. ADAMS.